United States Patent Office 3,189,626
Patented June 15, 1965

3,189,626
16α-BROMO- AND 16α-IODO PREGNANES
Donald E. Ayer, Portage Township, Kalamazoo County, Mich., assignor to The Upjohn Company, Kalamazoo, Mich., a corporation of Delaware
No Drawing. Filed Dec. 11, 1963, Ser. No. 329,894
3 Claims. (Cl. 260—397.45)

This invention relates to novel steroid compounds and is more particularly concerned with anti-inflammatory 16α-bromo- and 16α-iodo-11β,17α-dihydroxypregnenes and intermediates in the production thereof.

It is an object of the present invention to provide new anti-inflammatory steroids having a 16α-bromo or 16α-iodo group in their structure. It is a further object of this invention to provide an elegant method to produce these rather difficult to obtain 16α-halo steroids in good yield.

The novel compounds, particularly 16α-halohydrocortisones, 16α-haloprednisolones, 16α-halo-9α-fluorohydrocortisones, 16α-halo-9α-fluoroprednisolones, and the acylates thereof and 6α-methyl-9α-fluoro-11β,17α-dihydroxy-16α-halo-1,4-pregnadiene-3,20-dione, wherein "halo" is bromo and iodo, have considerable anti-inflammatory and glucocorticoid activity, and are thus useful in the treatment of mammals and birds having arthritic, allergic, topical-inflammatory, and asthmatic conditions. The novel compounds can be given in the form of tablets, pills or in capsules, or in liquid form for administration as elixirs or syrups, in injectable forms, as oil suspensions, or in drops, ointments, lotions and salves for topical application. The compounds can also be applied in the case of ketosis of cattle.

The compounds are further useful for the production of other steroids since they have the advantage of not forming 16,17-oxido compounds by elimination of hydrogen halide when in contact with a basic medium. The corresponding 16β-halo compounds will readily undergo precisely such an elimination reaction and are therefore not useful in many chemical syntheses. The 16α-halo group may be used to introduce other substituents in this position, e.g. by metathetic reactions to give other halo substituted steroids, alkyl substituted or hydroxy substituted steroids and the like.

The anti-inflammatory activity of 6α-methyl-9α-fluoro-16α-bromo-11β,17α-dihydroxy - 1,4-pregnadiene-3,20-dione was found to be 44 times that of hydrocortisone in the granuloma pouch. Since the same compound had a thymus involution activity of only 10 times that of hydrocortisone, favorable pharmaceutical ratios are indicated.

The processes to produce the compounds of this application and the starting materials necessary to produce such compounds are shown in the examples.

*Example 1.—16α-bromo-6α-methyl-9α-fluoro-11β,17α-dihydroxy-1,4-pregnadiene-3,20-dione*

A solution was prepared containing 500 mg. of 6α-methyl-9α-fluoro-11β-hydroxy - 1,4,16-pregnatriene-3,20-dione in 10 ml. of benzene and 100 ml. of methanol. This solution was cooled rapidly in an ice bath and 2 ml. of 50% sodium hydroxide solution were added under stirring, followed by 5 ml. of 30% hydrogen peroxide. The reaction was allowed to proceed for 18 hours at +5° C. and at the end of this time the excess hydrogen peroxide was destroyed with 0.2 g. of 5% palladium-on-calcium carbonate under stirring for 10 minutes. After removing the insoluble material by filtration, the filtrate was neutralized by the addition of 10% aqueous acetic acid. The solvent was then removed in vacuo and the crystalline material which formed was collected by filtration, washed with methanol and dried in vacuo, to give 0.37 g. of material melting at 207–211° C. Crystallization from methanol and acetone-Skellysolve B hexanes gave pure 6α-methyl-9α-fluoro-11β-hydroxy-16,17-oxido-1,4-pregnadiene-3,20-dione of melting point 275–278° C. having an analysis as follows:

*Analysis.*—Calcd. for $C_{22}H_{27}O_4F$: C, 70.60; H, 7.22; F, 5.08. Found: C, 70.48; H, 7.27; F, 5.14.

A solution was prepared containing 1 g. of 6α-methyl-9α-fluoro-11β-hydroxy - 16,17 - oxido-1,4-pregnadiene-3,20-dione in 30 ml. of acetic acid. To this solution was added 1 ml. of 30 to 32% hydrogen bromide in acetic acid. After ¼ hour at 25° C. and 3 hours at +5° C., the reaction mixture was diluted to 250 ml. with ice water and filtered. The filter cake was washed carefully with water and dried in vacuo over anhydrous potassium hydroxide at 25° C. to give 0.96 g. (80%) of the crude bromohydrin, 16β-bromo-6α-methyl-9α-fluoro - 11β,17α-dihydroxy-1,4-pregnadiene-3,20-dione melting at 147–155° C. Recrystallizing this material from acetone-Skellysolve B hexanes gave pure 16β-bromo-6α-methyl-9α-fluoro-11β,17α-dihydroxy-1,4 - pregnadiene-3,20-dione of melting point 153–160° C. and having the following analysis:

*Analysis.*—Calcd. for $C_{22}H_{28}BrFO_4$: C, 58.06; H, 6.20; F, 4.17. Found: C, 58.08; H, 6.21; F, 3.92.

A solution of 0.56 g. of 16β-bromo-6α-methyl-9α-fluoro - 11β,17α-dihydroxy-1,4-pregnadiene-3,20-dione in 25 ml. of methanol was refluxed with 0.28 g. of Raney nickel for 2 hours, then was cooled and filtered. The filtrate was evaporated to give 0.5 g. of a white foamy material which was chromatographed on 100 g. of Florisil, using gradient elution with 4 l. of acetone-Skellysolve B hexanes from 0 to 40%. This gave only a partial separation.

Crystallization of the least polar fractions from acetone-Skellysolve B hexanes gave 40 mg. of 6α-methyl-9α-fluoro-11β-hydroxy-16,17-oxido-1,4 - pregnadiene - 3,20-dione. Slightly more polar fractions were crystallized twice from acetone-Skellysolve B hexanes to give 99 mg. of 16α-bromo-6α-methyl-9α-fluoro-11β,17α - dihydroxy-1,4-pregnadiene-3,20-dione of melting point 262–272° C. with decomposition and having an analysis as follows:

*Analysis.*—Calcd. for $C_{22}H_{28}BrFO_4$: Br, 17.55; F, 4.17. Found: Br, 17.43; F, 4.35.

*Example 2.—16α-bromo-11β,17α,21-trihydroxy-4-pregnene-3,20-dione, 21-acetate*

A mixture was prepared containing 16β-bromo-17α,21-dihydroxy-4-pregnene-3,20-dione [obtained in crude form by reacting 20 g. of 16α,17α-oxido-4-pregnen-21-ol-3,20-dione acetate with hydrogen bromide and submitting the bromohydrin to acid solvolysis as described by W. T. Moreland, et al., J. Am. Chem. Soc. 84, 2966 (1962)] in 780 ml. of methanol and containing 9.75 g. of Raney nickel priorly washed with acetic acid, and methanol. This mixture was refluxed under vigorous stirring for a period of 4 hours. The reaction mixture was then cooled, filtered through Celite diatomaceous earth and evaporated. The residue remaining from the evaporation was recrystallized from aqueous methanol to give 9.95 g. of 16α-bromo-17α,21-dihydroxy-4-pregnene-3,20-dione of melting point 146–155° C. with decomposition.

This material was acetylated in a mixture consisting of acetic anhydride and pyridine at 25° C. After the reaction was terminated the mixture was poured into ice water and the precipitate collected and recrystallized from acetone-Skellysolve B hexanes to give 8.65 g. of 16α-bromo-17α,21-dihydroxy-4-pregnene-3,20-dione 21-acetate of melting point 202–203° C. and the following analysis.

*Analysis.*—Calcd. for $C_{23}H_{31}BrO_5$ (467.42): C, 59.10; H, 6.69; Br, 17.10. Found: C, 59.02; H, 6.86; Br, 17.16.

Two grams of 16α-bromo-17α,21-dihydroxy-4-pregnene-3,20-dione, 21-acetate was fermented with a 72 hour growth of *Curvularia lunata* QM120h (NRRL No. 2380) in a 10 liter nutrient solution, under aerobic conditions at about 28° C. for a period of 48 hours at a strating pH of 4.65, final pH 7.6, aeration 0.5 liter per minute. After the fermentation was completed, the fermentation broth was extracted several times with ethylene dichloride and the ethylene dichloride washed with water and thereupon evaporated to give a solid material. This material was dissolved again in methylene chloride, the methylene chloride solution washed with water, dried over anhydrous sodium sulfate and evaporated to give 1.17 g. of a tan foam of crude 16α-bromo-11β,17α,21-trihydroxy-4-pregnene-3,20-dione. A portion of 0.67 g. of this 16α-bromo-11β,17α,21-trihydroxy-4-pregnene-3,20-dione was acetylated with acetic anhydride and pyridine at room temperature, the reaction mixture was poured into water and extracted with methylene chloride. The methylene chloride extracts were then combined and evaporated to give 0.59 g. of crude 16α-bromo-11β,17α,21-trihydroxy-4-pregnene-3,20-dione 21-acetate which was chromatographed over Florisil anhydrous magnesium silicate. Fractions with 2½, 5, 10 and 12½% acetone-balance Skellysolve B hexanes were discarded and the fractions obtained with 15% acetone-85% Skellysolve B hexanes were combined, evaporated and the material recrystallized from acetone-Skellysolve B hexanes to give 0.22 g. of 16α - bromo-11β,17α,21-trihydroxy-4-pregnene-3,20-dione, 21-acetate of melting point 193–197° C. This 21-acetate was recrystallized again from methanol to give pure 16α - bromo-11β,17α,21-trihydroxy-4-pregnene-3,20-dione, 21-acetate of melting point 197–200° C. and having an analysis as follows:

*Analysis.*—Calcd. for $C_{23}H_{31}BrO_6$ (483.42): C, 57.14; H, 6.46; Br, 16.53. Found: C, 57.61; H, 7.06; Br, 15.90.

*Example 3.—16α-bromo-11β,17α,21-trihydroxy-1,4-pregnadiene-3,20-dione, 21-acetate*

One and three-tenths grams of 16α-bromo-17α,21-dihydroxy-4-pregnene-3,20-dione, 21-acetate was fermented with a growth of *Curvularia lunata* [NRRL No. 2380] which was obtained after 48 hours of incubation and a low aeration of 0.3 liter per 10 liters per minute. The fermentation with the steroid was continued for 48 hours at a starting pH of 7.0, final pH of 7.7 and the material thereupon extracted with methylene chloride. The methylene chloride extracts were evaporated and the dry material partitioned between methylene chloride and water. The organic layer was separated, dried over magnesium sulfate and evaporated, leaving a yellow foam of 1.09 g. weight. This foam was acetylated in a solution of 2.6 ml. of acetic anhydride and 1.3 ml. of pyridine at room temperature. The reaction mixture was thereupon poured into water and the material filtered, giving 1.1 g. of a white foam. This foam was chromatographed over 100 g. of Florisil anhydrous magnesium silicate showing a peak in the fractions consisting of 15% acetone:85% Skellysolve B hexanes. These fractions were evaporated to give 0.527 g. of material. Recrystallization of this material from aqueous ethanol resulted in a gel. Heating the gel to a higher temperature produced a dried product (0.3 g.) having a melting point of 214–223° C. A second recrystallization from aqueous ethanol gave pure 16α-bromo-11β,17α,21-trihydroxy-1,4-pregnadiene-3,20-dione, 21-acetate of melting point 225–231° C. and having the following analysis:

*Analysis.*—Calcd. for $C_{23}H_{29}BrO_6$ (481.38): C, 57.38; H, 6.07; Br, 16.60. Found: C, 57.42; H, 6.00; Br, 16.20.

The nuclear magnetic resonance showed that this was indeed a $\Delta^{1,4}$ steroid.

*Example 4.—16α-bromo-11β,17α,21-trihydroxy-1,4-pregnadiene-3,20-dione*

One gram of 16α-bromo-11β,17α,21-trihydroxy-1,4-pregnadiene-3,20-dione, 21-acetate, dissolved in 20 ml. of methanol containing 0.5 ml. of water and 0.5 g. of sodium bicarbonate, was stirred for 10 minutes and then allowed to stand at room temperature for 2 hours. The reaction mixture was thereupon poured into 100 ml. of ice-water and the mixture put in the refrigerator overnight (about 16 hours at 5° C.). The mixture was then filtered and the precipitate washed with water. Thereafter, the precipitate was recrystallized twice from methanol to give the free alcohol 16α-bromo-11β,17α,21-trihydroxy-1,4-pregnadiene-3,20-dione.

*Example 5.—16α-bromo-11β,17α,21-trihydroxy-1,4-pregnadiene-3,20-dione, 21-benzoate*

A solution was prepared containing 0.5 g. of 16α-bromo-11β,17α,21-trihydroxy-1,4-pregnadiene-3,20-dione in 5 ml. of pyridine and 3 g. of benzoic acid anhydride. This solution was allowed to stand at room temperature (25° C.) for a period of 4 hours, and was thereupon poured into ice water. The ice water solution was transferred to a refrigerator at 5° C. and was allowed to stand there for a period of 2 hours. Thereafter the solution was filtered and the precipitate collected on a filter, washed repeatedly with water. It was then recrystallized 3 times from aqueous methanol to give pure 16α-bromo-11β,17α,21-trihydroxy-1,4-pregnadiene-3,20-dione 21-benzoate.

*Example 6.—16α-bromo-11β,17α,21-trihydroxy-1,4-pregnadiene-3,20-dione, 2-(β-cyclopentylpropionate)*

In the same manner given in Example 5, 0.5 g. of 16α-bromo - 11β,17α,21-trihydroxy-1,4-pregnadiene-3,20-dione in pyridine solution was reacted with 2 ml. of β-cyclopentylpropionyl bromide. After recrystallization from methanol 16α - bromo-11β,17α,21-trihydroxy-1,4-pregnadiene-3,20-dione, 21-(β-cyclopentylpropionate) was obtained.

In the same manner given in Examples 5 and 6, reacting in pyridine solution 16α-bromo-11β,17α,21-trihydroxy-1,4-pregnadiene-3,20-dione:

(a) With propionic acid anhydride gave 16α-bromo-11β,17α,21-trihydroxy-1,4-pregnadiene-3,20-dione, 21-propionate;

(b) With phenylacetic acid chloride gave 16α-bromo-11β,17α,21 - trihydroxy-1,4-pregnadiene-3,20-dione 21-phenylacetate;

(c) With phenylpropionic anhydride gave 16α-bromo-11β,17α,21 - trihydroxy - 1,4-pregnadiene-3,20-dione, 21-phenylpropionate;

(d) With lauryl chloride gave 16α-bromo-11β,17α,21-trihydroxy-1,4-pregnadiene-3,20-dione, 21-laurate.

*Example 7.—16α-bromo-11β,17α,21-trihydroxy-4-pregnene-3,20-dione*

In the manner given in Example 4, 16α-bromo-11β,17α,21-trihydroxy-4-pregnene-3,20-dione, 21-acetate was hydrolyzed in methanol in the presence of sodium bicarbonate to give the free alcohol 16α-bromo-11β,17α,21-trihydroxy-4-pregene-3,20-dione.

*Example 8.—16α-bromo-11β,17α,21-trihydroxy-4-pregnene-3,20-dione, 21-propionate*

In the manner given in Example 5, 16α-bromo-11β,17α,21-trihydroxy-4-pregnene-3,20-dione, dissolved in pyridine, was reacted with propionic acid anhydride to give 16α-bromo-11β,17α,21-trihydroxy-4-pregnene-3,20-dione, 21-propionate.

*Example 9.—16α - bromo - 11β,17α,21 - trihydroxy - 4-pregnene-3,20-dione, 21-phenylacetate*

In the manner given in Example 6, 16α-bromo-11β,17α, 21-trihydroxy-4-pregnene-3,20-dione, dissolved in pyridine, was reacted with phenylacetyl chloride to give 16α-bromo-11β,17α,21-trihydroxy-4-pregnene-3,20-dione, 21-phenylacetate.

In the same manner as given in Examples 5 and 6 other esters of 16α-bromo-11β,17α,21-trihydroxy-4-pregnene-3,20-dione can be prepared by reacting this steroid in pyridine solution with anhydrides and acyl halides of selected organic carboxylic acids. Representative other esters thus prepared include the butyrate, valerate, hexanoate, heptanoate, octanoate, decanoate, laurate, phenylpropionate, isobutyrate, β-cyclopentylpropionate, and the like of 16α-bromo-11β,17α,21-trihydroxy-4-pregnene-3,20-dione.

*Example 10.—16-iodo-17α,21-dihydroxy-4-pregnene-3,20-dione, 21-acetate*

A solution of 21-hydroxy-16α,17α-oxido-4-pregnene-3,20-dione acetate in acetic acid was reacted with hydrogen iodide and submitted to acid solvolysis to give 16β-iodo-17α,21-dihydroxy-4-pregnene-3,20-dione. The crude material obtained in this reaction was stirred and refluxed in methanol with Raney nickel for 4 hours to give 16α-iodo-17α,21-dihydroxy-4-pregnene-3,20-dione. The mixture was then cooled and filtered and the filtrate evaporated. The thus-obtained material was once recrystallized from methanol and was used in this form for acetylation in an acetic anhydride-pyridine mixture. After recrystallization of the material obtained from this esterification procedure, pure 16α-iodo-17α,21-dihydroxy-4-pregnene-3,20-dione, 21-acetate was obtained.

*Example 11.—16α-iodo-11β,17α,21-trihydroxy-4-pregnene-3,20-dione 21-acetate*

Two grams of 16α-iodo-17α,21-dihydroxy-4-pregnene-3,20-dione 21-acetate were submitted to fermentation with *Cunninghamella blakesleeana* under the conditions described in U.S. Patent 2,735,800. After the fermentation was completed the material obtained was extracted with ethyleen dichloride, the ethylene dichloride fractions were washed with water, combined, dried over anhydrous sodium sulfate, and evaporated. The crude material thus obtained was immediately acetylated in acetic anhydride-pyridine at room temperature. The mixture, after standing at room temperature for 2 hours, was poured into ice water, transferred into a refrigerator at 3° C. for 1 hour, thereupon filtered and the thus-obtained precipitate washed with water and recrystallized 2 times from acetone-Skellysolve B to give 16α-iodo-11β,17α,21-trihydroxy-4-pregnene-3,20-dione, 21-acetate.

*Examples 12.—16α-iodo-11β,17α,21-trihydroxy-1,4-pregnadiene-3,20-dione, 21-acetate*

One gram of 16α-iodo-11β,17α,21-trihydroxy-4-pregnene-3,20-dione, 21-acetate was refluxed with 0.5 g. of selenium dioxide in 50 ml. of t-butyl alcohol for a period of 24 hours. The mixture was then filtered and the filtrate was evaporated. The dry material was dissolved in 10 ml. of methanol and the solution thus obtained was filtered again. The thus-obtained fitrate was concentrated until crystallization began, hence it was allowed to cool to room temperature and finally in a refrigerator to 5° C. The thus-obtained crystals were recovered by filtration, dried in vacuo and twice recrystallized from aqueous methanol to give pure 16α-iodo-11β,17α,21-trihydroxy-1,4-pregnadiene-3,20-dione, 21-acetate.

In the same manner given in Example 4, 16α-iodo-11β,17α,21-trihydroxy-4-pregnene-3,20-dione, 21-acetate and 16α-iodo-11β,17α,21-trihydroxy-1,4-pregnadiene-3,20-dione, 21-acetate can be hydrolyzed in methanol with sodium or potassium bicarbonate, sodium carbonate, or potassium carbonate to give the corresponding free alcohols, 16α-iodo-11β,17α,21-trihydroxy-4-pregnene-3,20-dione and 16α-iodo-11β,17α,21-trihydroxy-1,4-pregnadiene-3,20-dione.

The free alcohols, 16α-iodo-11β,17α,21-trihydroxy-4-pregnene-3,20-dione and 16α-iodo-11β,17α,21-trihydroxy-1,4-pregnadiene-3,20-dione, can be esterified in conventional manner as shown in Examples 5 and 6 to give the corresponding 21-esters. Representative esters thus obtained include the 21-propionate, -butyrate, -valerate, -heptanoate, -octanoate, -laurate, -phenylacetate, -phenylpropionate, -ethylbenzoate, -isobutyrate, -isovalerate, -β-cyclopentylpropionate, -hexanoate, -decanoate, and the like of 16α-iodo-11β,17α,21-trihydroxy-4-pregnene-3,20-dione and 16α-iodo-11β,17α,21-trihydroxy-1,4-pregnadiene-3,20-dione.

*Example 13.—16α-bromo-9α-fluoro-11β,17α,21-trihydroxy-4-pregnene-3,20-dione, 21-acetate*

To a solution of 0.55 g. of 16α-bromo-11β,17α,21-trihydroxy-4-pregnene-3,20-dione, 21-acetate in 12 ml. of pyridine was added 0.3 g. of N-bromoacetamide. After standing at room temperature for a period of 15 minutes the reaction mixture was cooled to 5° C. and with shaking sulfur dioxide was passed over the surface until the solution gave no color with acidified starch iodine paper. The temperature was maintained in the range of 10 to 20° C. After termination of the reaction, the mixture was poured into 200 ml. of ice water and the resulting precipitate collected by filtration. This material consisted of 16α-bromo-17α,21-dihydroxy-4,9(11)-pregnadiene-3,20-dione, 21-acetate and was immediately used for the next step.

The 16α-bromo-17α,21-dihydroxy-4,9(11)-pregnadiene-3,20-dione, 21-acetate, as obtained above, was dissolved in a mixture of 3.5 ml. of methylene chloride and 6.2 ml. of t-butyl alcohol. A solution of 0.55 ml. of 70% perchloric acid in 0.43 ml. of water was added followed by a solution of 0.086 g. of N-bromoacetamide in 0.86 ml. of t-butyl alcohol. The resultant solution was stirred at 25° C. for 15 minutes, then a solution of 0.086 g. of sodium sulfite in 0.86 ml. of water was added and solvents were evaporated at reduced pressure. The residue was partitioned between methylene chloride-water; the methylene chloride extract was dried and evaporated to give 0.216 g. of 9α,16α-dibromo-11β,17α,21-trihydroxy-4-pregnene-3,20-dione, 21-acetate, which was used directly in the next step.

To a solution of the above-obtained 9α,16α-dibromo-11β,17α,21-trihydroxy-4-pregnene-3,20-dione, 21-acetate in acetone (6 ml.) was added 0.24 g. of potassium acetate and the resulting suspension stirred under reflux for 16 hours. The mixture was evaporated to dryness leaving a residue. This residue was partitioned between methylene chloride and water. The methylene chloride extract was dried, evaporated and the residue chromatographed on 25 g. of Florisil anhydrous magnesium silicate. The principal fractions eluted with 15% acetone-Skellysolve B hexanes consisted of 0.12 g. of 16α-bromo-9β,11β-oxido-17α,21-dihydroxy-4-pregnene-3,20-dione, 21-acetate.

The thus-obtained 16α-bromo-9β,11β-oxido-17α,21-dihydroxy-4-pregnene-3,20-dione, 21-acetate dissolved in methylene chloride (2 ml.) was cooled to —70° C. and added to a mixture of 2.0 g. of hydrogen fluoride and 3.5 ml. of tertahydrofuran at —20° C. The mixture was allowed to stand 16 hours at —20° C. and 4 hours at +5° C. At the end of this period it was mixed cautiously with an excess of cold sodium bicarbonate solution and the organic material was extracted with ethyl acetate. The combined organic extracts were washed with water, dried over anhydrous sodium sulfate and evaporated. The residue was chromatographed over 10 g. of Florisil anhydrous magnesium silicate using Skellysolve B hexanes-acetate mixture as eluents. The portion containing a peak fraction was evaporated and the product recrystallized from ethanol giving 34 mg. of 16α-bromo-9α-fluoro-11β,17α,21-trihydroxy-4-pregnene-3,20-dione, 21-acetate of melting point 220–227° C. and having an analysis as follows:

*Analysis.*—Calcd. for $C_{23}H_{30}FBrO_6$ (501.39): F. 3.79. Found: F. 3.22.

In the same manner as given above 16α-bromo-11β,17α,21-trihydroxy-1,4-pregnadiene-3,20-dione, 21-acetate was converted to 16α-bromo-9α-fluoro-11β,17α,21-trihydroxy-1,4-pregnadiene-3,20-dione, 21-acetate.

In the same manner given in Example 13, 16α-iodo-

11β,17α,21 - trihydroxy - 1,4 - pregnadiene-3,20-dione, 21-acetate was converted to 16α-iodo-9α-fluoro-11β,17α,21-trihydroxy-1,4-pregnadiene-3,20-dione, 21-acetate.

*Example 14.—16α-bromo-9α-fluoro-11β,17α,21-trihydroxy-4-pregnene-3,20-dione*

In the manner given in Example 4, 16α-bromo-9α-fluoro-11β,17α,21-trihydroxy-4-pregnene-3,20-dione, 21-acetate was hydrolyzed in a solution of methanol in the presence of potassium bicarbonate to give the free alcohol, 16α-bromo-9α-fluoro-11β,17α,21-trihydroxy-4-pregnene-3,20-dione.

In the same manner as above 16α-bromo-9α-fluoro-11β,17α,21 - trihydroxy - 1,4 - pregnadiene-3,20-dione, 21-acetate was converted to the free alcohol, 16α-bromo-9α-fluoro-11β,17α,21-trihydroxy-1,4-pregnadiene-3,20-dione.

In the same manner as above 16α-iodo-9α-fluoro-11β,17α,21-trihydroxy-1,4-pregnadiene-3,20-dione, 21-acetate was converted to the free alcohol, 16α-iodo-9α-fluoro-11β,17α,21-trihydroxy-1,4-pregnadiene-3,20-dione.

*Example 15.—16α-bromo-9α-fluoro-11α,17β,21-trihydroxy-4-pregnene-3,20-dione, 21-propionate*

In a manner analogous to Example 5, 16α-bromo-9α-fluoro - 11β,17α,21-trihydroxy-4-pregnene-3,20-dione was reacted in pyridine solution with propionic anhydride to give the 16α-bromo-9α-fluoro-11β,17α,21-trihydroxy-4-pregnene-3,20-dione, 21-propionate.

*Example 16*

In the maner as given in Example 5, a pyridine solution of 16α-bromo-9α-fluoro-11β,17α,21-trihydroxy-4-pregnene 3,20-dione is reacted with:

(a) Butyric anhydride to give 16α-bromo-9α-fluoro-11β,17α,21 - trihydroxy-4-pregnene-3,20-dione, 21-butyrate;

(b) Valeric anhydride to give 16α-bromo-9α-fluoro-11β,17α,21-trihydroxy-4-pregnene-3,20-dione, 21-valerate;

(c) Phenylpropionic anhydride to give 16α-bromo-9α fluoro-11β,17α,21-trihydroxy-4-pregnene-3,20-dione, 21-phenylpropionate;

(d) Lauryl chloride to give 16α-bromo-9α-fluoro-11β,17α,21-trihydroxy-4-pregnene-3,20-dione, 21-laurate;

(e) β-cyclopentylpropionyl chloride to give 16α-bromo - 9α-fluoro-11β,17α,21-trihydroxy-4-pregnene-3,20-dione, 21-(β-cyclopentylpropionate).

*Example 17*

In the manner as given in Example 5, a pyridine solution of 16α-bromo-9α-fluoro-11β,17α,21-trihydroxy-1,4-pregnadiene-3,20-dione is reacted with:

(a) Butyric anhydride to give 16α-bromo-9α-fluoro-11β,17α,21-trihydroxy-1,4-pregnadiene-3,20-dione, 21-butyrate;

(b) Valeric anhydride to give 16α-bromo-9α-fluoro-11β,17α,21 - trihydroxy - 1,4-pregnadiene-3,20-dione, 21-valerate;

(c) Phenylpropionic anhydride to give 16α-bromo-9α-fluoro - 11β,17α,21-trihydroxy-1,4-pregnadiene-3,20-dione, 21-phenylpropionate;

(d) Lauryl chloride to give 16α-bromo-9α-fluoro-11β, 17α,21 - trihydroxy - 1,4-pregnadiene-3,20-dione, 21-laurate;

(e) β-cyclopentylpropionyl chloride to give 16α-bromo-9α - fluoro-11β,17α,21-trihydroxy-1,4-pregnadiene-3,20-dione, 21-(β-cyclopentylpropionate).

*Example 18.—16α-iodo-9α-fluoro-11β,17α,21-trihydroxy-4-pregnene-3,20-dione, 21-acetate*

Likewise as described in Example 13, 16α-iodo-11β, 17α,21-trihydroxy-4-pregnene-3,20-dione, 21-acetate is treated with N-bromosuccinimide in pyridine and then with sulfur dioxide to give 16α-iodo-17α,21-dihydroxy-4,9 (11)-pregnadiene-3,20-dione, 21-acetate.

The thus-obtained 4,9(11)-pregnadiene is treated in t-butyl alcohol with N-bromoacetamide and aqueous perchloric acid to give 9α-bromo-16α-iodo-11β-17α,21-trihydroxy-4-pregnene-3,20-dione, 21-acetate.

9α - bromo - 16α - iodo-11β,17α,21-trihydroxy-4-pregnene-3,20-dione, 21-acetate, as obtained above, is treated with potassium acetate in acetone solution to give 16α-iodo - 9β,11β - oxido-17α,21-dihydroxy-4-pregnene-3,20-dione, 21-acetate which was reacted with hydrogen fluoride to give 16α-iodo-9α-fluoro-11β,17α,21-trihydroxy-4-pregnene-3,20-dione, 21-acetate.

*Example 19.—16α-iodo-9α-fluoro-11β,17α,21-trihydroxy-4-pregnene-3,20-dione*

Likewise as described in Example 4, 16α-iodo-9α-fluoro - 11β,17α,21-trihydroxy-4-pregnene-3,20-dione, 21-acetate is hydrolyzed in methanol solution with potassium bicarbonate. The product after recrystallization was pure 16α - iodo - 9α-fluoro-11β,17α,21-trihydroxy-4-pregnene-3,20-dione.

Likewise as shown hereinabove, other esters of 16α-iodo - 9α - fluoro-11β,17α,21-trihydroxy-4-pregnene-3,20-dione can be obtained by reacting this steroid in pyridine solution with selected acyl halides and acid anhydrides of organic carboxylic acids, especially hydrocarbon carboxylic acids containing from 1 to 12 carbon atoms. Representative esters thus prepared include the 21-propionate, -butyrate, -valerate, -hexanoate, -heptanoate, -octanoate, -decanoate, -laurate, -β-cyclopentyl-propionate, -isobutyrate, -benzoate, -ethylbenzoate, -phenylacetate, phenylpropionate, and the like of 16α-iodo-9α-fluoro-11β, 17α,21-trihydroxy-4-pregnene-3,20-dione.

*Example 20.—16α-iodo-9α-fluoro-11β,17α-dihydroxy-6α-methyl-1,4-pregnadiene-3,20-dione*

In the manner given in Example 1, 6α-methyl-9α-fluoro - 11β - hydroxy-16,17-oxido-1,4-pregnadiene-3,20-dione in acetic acid was reacted with hydrogen iodide. After ¼ hour at room temperature and 3 hours in a refrigerator at 5° C., the reaction mixture was diluted with ice water and filtered. The filter cake was carefully washed with water and dried in vacuo over potassium hydroxide to give 16β-iodo-9α-fluoro-11β,17α-dihydroxy-6α-methyl-1,4-pregnadiene-3,20-dione.

This 16β-iodo steroid was refluxed in methanol solution in the presence of Raney nickel for 2 hours. The reaction mixture was cooled and filtered. The filtrate was evaporated to give a whitish foam material which was chromatographed over Florisil with gradient elution consisting of acetone and Skellysolve B hexane mixtures. The peak fraction was isolated and recrystallized to give pure 16α-iodo-9α-fluoro-11β,17α-dihydroxy-6α-methyl-1, 4-pregnadiene-3,20-dione.

I claim:

1. 16α - bromo-9α-fluoro-11β,17α,21-trihydroxy-4-pregnene-3,20-dione, 21-acetate.

2. 16α - iodo - 11β,17α,21-trihydroxy-4-pregnene-3,20-dione, 21-acetate.

3. 16α - iodo - 9α-fluoro-11β,17α,21-trihydroxy-4-pregnene-3,20-dione, 21-acetate.

References Cited by the Examiner

UNITED STATES PATENTS

| | | | |
|---|---|---|---|
| 3,016,392 | 1/62 | Magerlein et al. | 260—397.45 |
| 3,022,295 | 2/62 | Berg et al. | 260—239.55 |
| 3,049,556 | 8/62 | Hirschmann | 260—397.45 |
| 3,062,846 | 11/62 | Fried | 260—397.4 |
| 3,137,712 | 6/64 | Birkenmeyer et al. | 260—397.45 |

OTHER REFERENCES

Magerlein et al.: "Chemistry and Industry," No. 50, Dec. 16, 1961, pp. 2050–2051.

LEWIS GOTTS, *Primary Examiner.*